(12) United States Patent  
Kaminsky

(10) Patent No.: US 8,966,016 B2  
(45) Date of Patent: Feb. 24, 2015

(54) RESOURCE-BASED EVENT TYPING IN A RULES SYSTEM

(75) Inventor: David L. Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 2564 days.

(21) Appl. No.: 11/536,526

(22) Filed: Sep. 28, 2006

(65) Prior Publication Data

US 2008/0162579 A1 Jul. 3, 2008

(51) Int. Cl.
G06F 15/177 (2006.01)
G06F 9/54 (2006.01)
G06N 5/02 (2006.01)

(52) U.S. Cl.
CPC ............. *G06F 9/542* (2013.01); *G06N 5/025* (2013.01); *G06F 2209/543* (2013.01)
USPC ........................................................ 709/220

(58) Field of Classification Search
CPC ................................ G06N 5/025; G06F 9/542
USPC ........................................................ 709/220
See application file for complete search history.

(56) References Cited

U.S. PATENT DOCUMENTS

| 5,063,523 | A  | * | 11/1991 | Vrenjak ............... | 709/223 |
| 6,289,395 | B1 | * | 9/2001  | Apte et al. ........... | 719/318 |
| 6,892,230 | B1 | * | 5/2005  | Gu et al. .............. | 709/220 |
| 2007/0174429 | A1 | * | 7/2007 | Mazzaferri et al. .... | 709/218 |

FOREIGN PATENT DOCUMENTS

| EP | 1696315    | 8/2006 |
| JP | 2005216151 | 8/2005 |
| JP | 2006031350 | 2/2006 |
| WO | 03044683   | 5/2003 |

OTHER PUBLICATIONS

International Searching Authority, International Search Report and Written Opinion for International Application No. PCT/EP2007/060168, Feb. 8, 2008.
European Patent Office, Communication Pursuant to Article 94(3) EPC, Jul. 6, 2010.
Chinese Patent Office, Office Action Dated Dec. 31, 2011.

* cited by examiner

*Primary Examiner* — Maceeh Anwari
(74) *Attorney, Agent, or Firm* — Law Office of Jim Boice

(57) ABSTRACT

A computer-implementable method, system and computer media for typing a resource-based event in a rule system. In one embodiment, the computer-implementable method includes the steps of: defining an event type according to a resource property that is associated with the event type; creating a resource definition that describes which one or more event type can occur in a resource; storing the resource definition in the rule system; receiving asynchronous data from a particular resource in the data processing system; correlating the asynchronous data with a particular rule that is associated with a resource definition for the particular resource; and applying the particular rule to the asynchronous data.

20 Claims, 11 Drawing Sheets

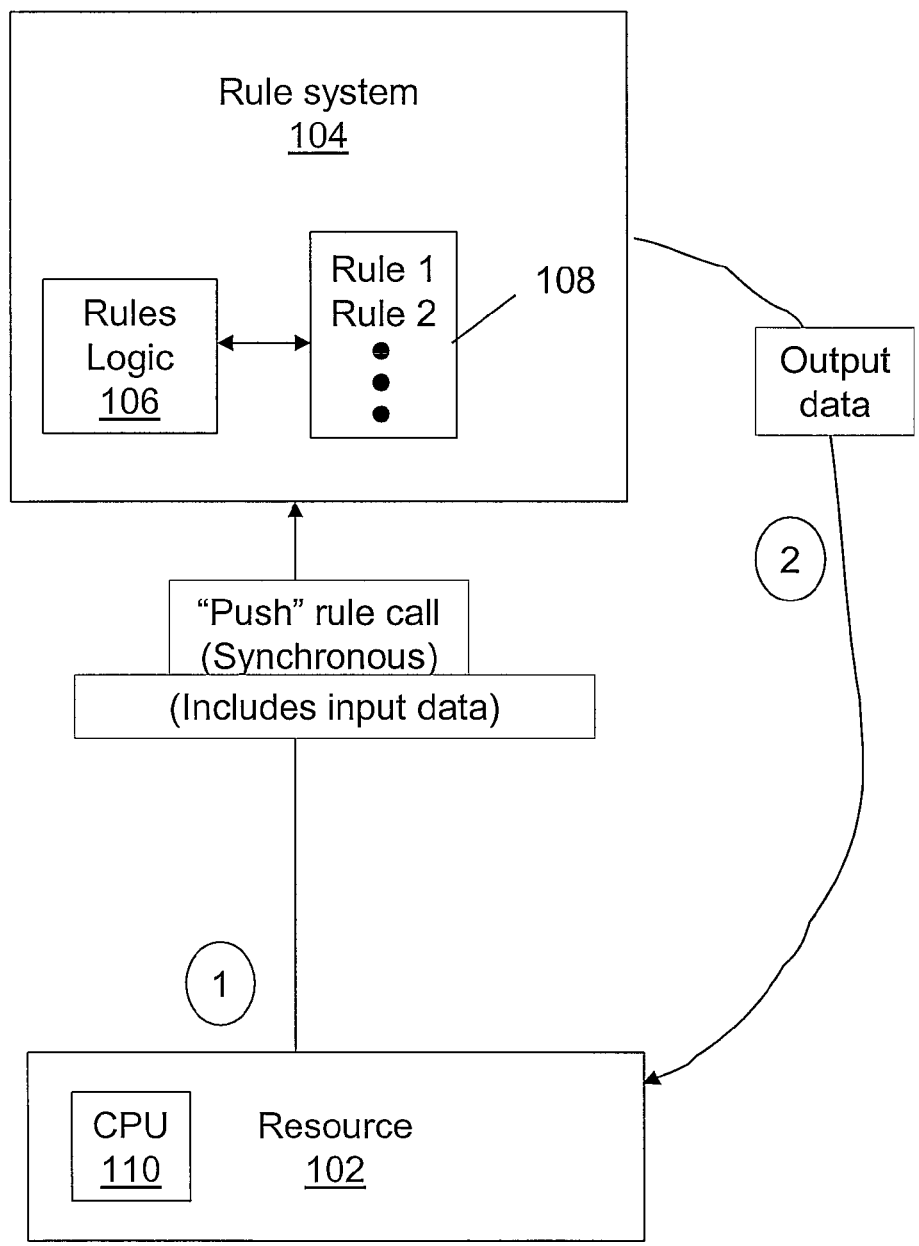

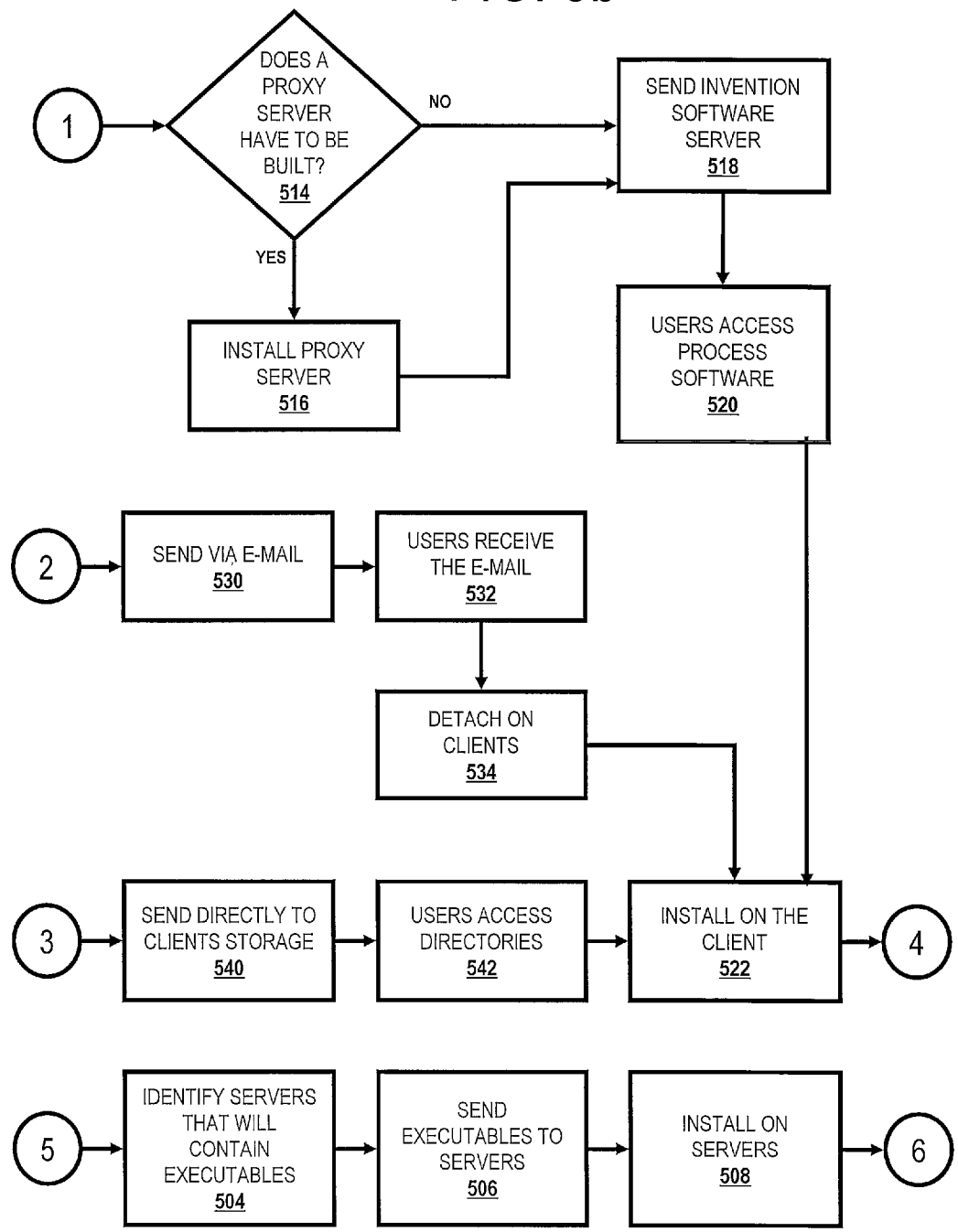

RESOURCE-BASED EVENT TYPING IN A RULES SYSTEM

BACKGROUND OF THE INVENTION

The present invention relates in general to the field of computers and other data processing systems, including hardware, software and processes. More particularly, the present invention pertains to the management of the resources of a data processing system using rules that are resource-based.

A computer system may have many resources as part of the system. These resources include both hardware (client computers, servers, printers, storage devices, etc.) as well as software (operating systems, applications, etc). Such resources are often given technical support by a central logic, which may include a rule system. Utilization of a rule in a rule system may be either through a "pull" or a "push".

For an example of a "pull," consider FIG. 1a. A resource 102 is supported by a rule system 104, which includes a miles logic 106 that interacts with a rules database 108. Assume for exemplary purposes that resource 102 is a server. Resource 102 "knows" that rule system 104 has a rule in rules database 108 related to how a Central Processing Unit (CPU) 110 in resource 102 is to be managed, but resource 102 does not "know" exactly how the CPU 110 is to be managed. Thus, resource 102 will (step 1) send a "pull" rule call to rule system 104, asking rule system 104 to process the appropriate rule for managing the CPU 110. Rule system 104 uses a descriptor language, such as Web Services Description Language (WSDL), to understand what data can be "pulled" from resource 102 to process that requested rule. This data is then requested by the rule system 104 from the resource 102 (i.e., "pulled"—step 2), resulting in the resource 102 sending the appropriate input data (step 3) for the rule. Rule system 104 then uses the rules logic 106 to apply the input data to the appropriate rule, and outputs the result data (step 4) to the resource 102.

For exemplary purposes shown in FIG. 1a, then, assume that there is a rule in rules database 108 that states "If CPU utilization exceeds 70% for three consecutive samplings, then disable low priority software processes." If CPU 110 actually exceeds 70% utilization for three consecutive samplings, then after Steps 1-4 execute, low priority processing will be disabled, preventing them from using any of CPU 110's capacity.

The example described above is only exemplary. Specifically, such a rule may also apply to software resources. That is, consider the example of resource 102 actually being a software program, rather than the server described above. This software program may "know" that discount pricing should be given to certain orders, but doesn't "know" any details about when such discounts should be given, or for how much. Thus, the resource 102 will send a request (step 1) for a rule about pricing to the rule system 104, which will (using WSDL to determine what data can be pulled) pull data (step 2) regarding how large the order is. The resource 102 will then respond with the order size (e.g., dollar amount), as shown in step 3. The rule system 104 will then respond with how much the order should be discounted (step 4).

Another type of rule utilization is known as a "push" system. A "push" may be synchronous or asynchronous. Consider first a "synchronous push," as described in FIG. 1b. In this scenario, the resource 102 "knows" not only what rule it needs (from rules database 108), but resource 102 also knows what input parameters are needed for the needed rule. Thus, the resource 102 concurrently sends a request for a particular rule in rules database 108 as well as the necessary input data (step 1). The rule system 104 then uses rules logic 106 to apply the received input data to the requested rule from rules database 108, and sends the output data (which results from the input data being applied to the particular rule) to the resource 102 (step 2). Note that while the systems shown in FIGS. 1a and 1b are similar, in FIG. 1a, the rule system 104 subsequently goes back to the resource 102 to ask for the additional information (shown in the "Pull for Value" Step 2 in FIG. 1a).

While FIG. 1a and FIG. 1b demonstrate differing "pull" and "synchronous push" systems, they are similar in that both systems described in FIGS. 1a-b permit a rules engine to query a resource for data. This is not the case, however, in an "asynchronous push" system.

FIG. 1c describes such an "asynchronous push," in which data is pushed to the rule system 104, but without a request for a particular rule. Unfortunately, this scenario is common in computer systems. That is, resources 102 routinely send a wide variety of event data to a central manager, which may include a rule system 104. For example, if the resource 102 is a server, then the event data may be for such disparate items as outside temperature, CPU utilization, page swapping, local time of day, clock speeds, number of users that are logged on, etc. This central manager and its associated rule system 104 does not "know" what to do with the event data that is received. More specifically, the rule system 104 does not know which rule in the rules database 108 is appropriate for the received asynchronous data.

SUMMARY OF THE INVENTION

To handle asynchronous data pushes describe above, the present invention presents a computer-implementable method, system and computer media for typing a resource-based event in a rule system. In one embodiment, the computer-implementable method includes the steps of: defining an event type according to a resource property that is associated with the event type; creating a resource definition that describes which one or more event type can occur in a resource; storing the resource definition in the rule system; receiving asynchronous data from a particular resource in the data processing system; correlating the asynchronous data with a particular rule that is associated with a resource definition for the particular resource; and applying the particular rule to the asynchronous data.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 1b illustrates a prior art synchronous "push" rule call;

FIG. 2b is a flow-chart showing exemplary steps taken to create and utilize the REML shown in FIG. 2a;

FIGS. 5a-b show a flow-chart of steps taken to deploy software capable of executing the steps shown and described in FIGS. 2a-b.

DETAILED DESCRIPTION OF THE PREFERRED EMBODIMENT

Figure 1A:
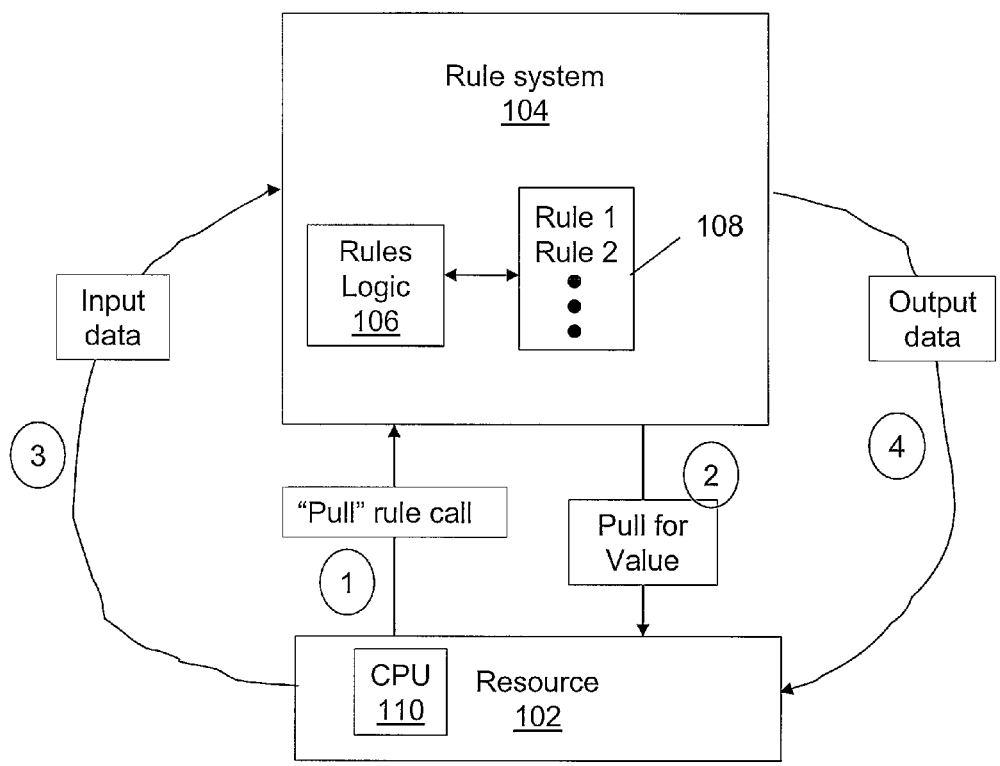
FIG. 1a depicts a prior art "pull" rule call.
Figure 1C:
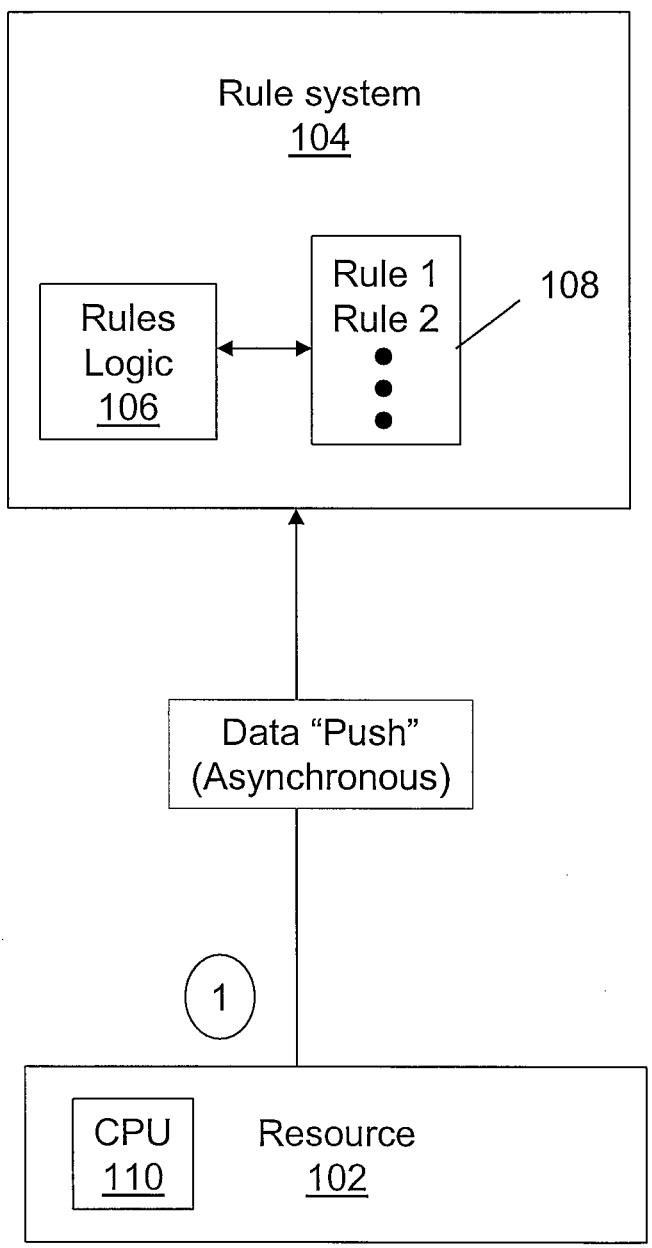
FIG. 1c depicts a prior art asynchronous "push" rule call.
Figure 2A:
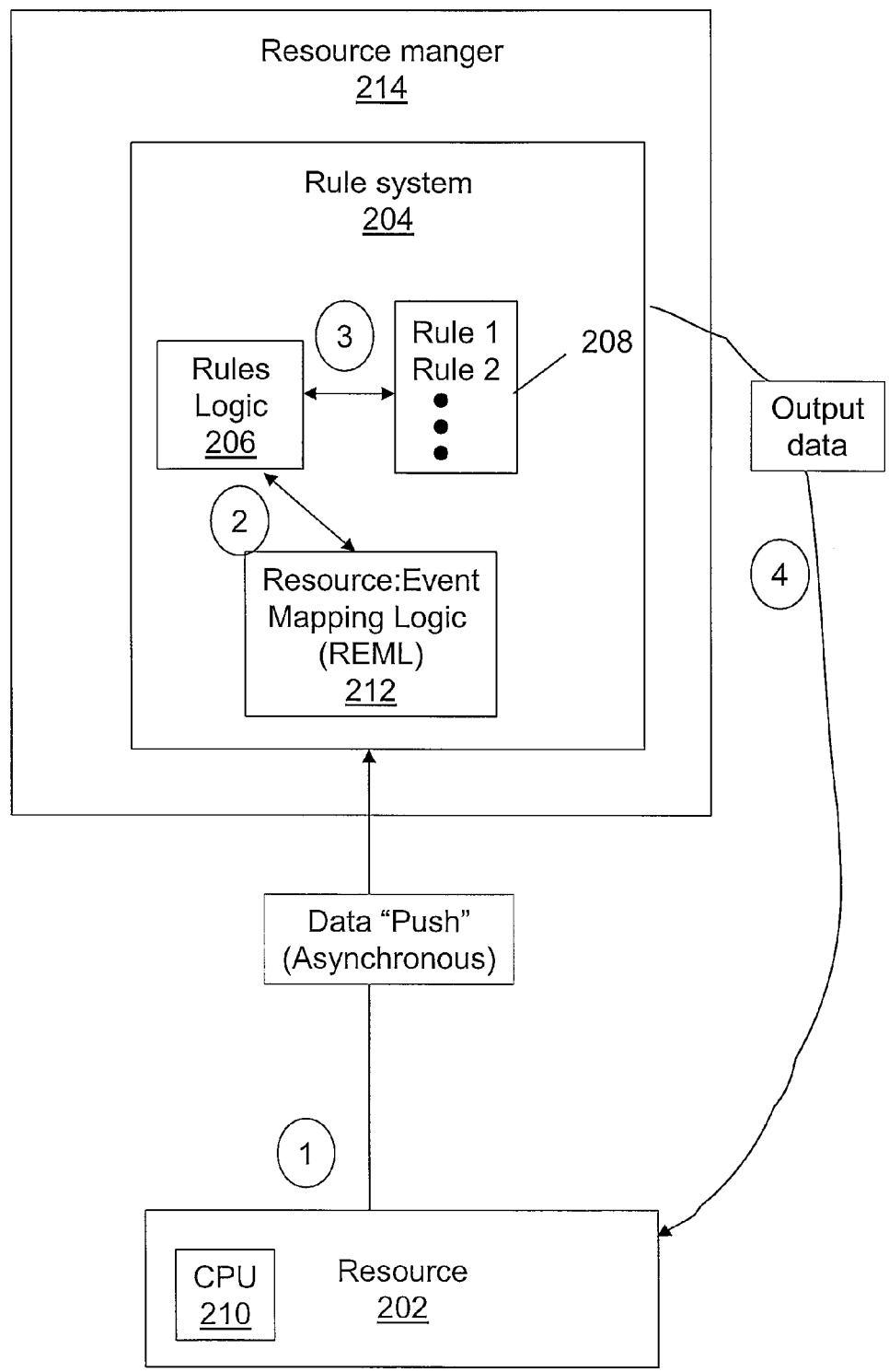
FIG. 2a depicts an asynchronous "push" rule call utilizing a Resource:Event Mapping Logic (REML)

With reference now to FIG. 2a, a exemplary utilization of a Resource:Event Mapping Logic (REML) 212 is presented. A resource 202 pushes data to a rule system 204. If resource 202 is a hardware resource, such as a server, then the data may be a CPU utilization rate, a page-swapping rate, a memory leakage level (amount of local dynamic memory that is unusable due to unnecessary data being stored in the local dynamic memory), etc. Similarly, if resource 202 is a software resource, then the data that is pushed to the rule system 204 may be data values that have been keyed in for execution by the software, the number of current users of the software, execution speed of the software, the frequency of data requests (if the resource 202 is a database), etc. When rule system 204 receives the data from the resource 202, REML 212 "knows" (by monitoring a particular port, or by parsing a data packet header, etc.) that the data came from a particular resource 202, whether the data is synchronous or asynchronous (according to definitions for the particular resource 202 stored in rule system 204, or by parsing the data packet header, etc.), and which rule in a rule database 208 can be used by that particular resource 202 for that type of data (as defined by a mapping table, not shown, that is available to REML 212).

For example, assume that resource 202 is a server that is routinely sending the utilization rate of its CPU 210. When these utilization readings data arrive (step 1) at rule system 204, REML 212 determines which rule (or rules) from rule database 208 should be called for a specific resource 202. This determination is made by logic in REML 212 that correlates a resource definition for resource 202 with event rules that are appropriate for the type of data received from resource 202 (as described in additional detail in FIG. 2b). As shown in step 2, REML 212 then sends, along with the received utilization readings data, an instruction to rules logic 206 to call a particular rule from rule database 208, and to input these received utilization readings data to the appropriate rule (step 3). The appropriate rule then sends an output from that rule to the resource 202 (step 4). (Note that the rule may or may not output data, depending on whether an "if" condition is satisfied. That is, most rules will output data only "if" the appropriate input data from a specific resource 202 is received for a rule in the rule system 204 that corresponds with that specific resource 202). Thus, rule system 204, which may be part of a larger resource manager 214, is able to evaluate and filter numerous data from resources 202 in order to appropriate a necessary rule. Note that REML 212 is described and presented as being part of rule system 204 in a resource manager 214. However, REML 212 should be understood to be an exemplary description/presentation of rules logic that performs the processes described herein. Thus, the scope of the invention and the appended claims is not to be limited to a logic so named and confined within rule system 204, but rather is understood to be a logic that is accessible to rule system 204 for the purposes described herein.

Figure 2B:
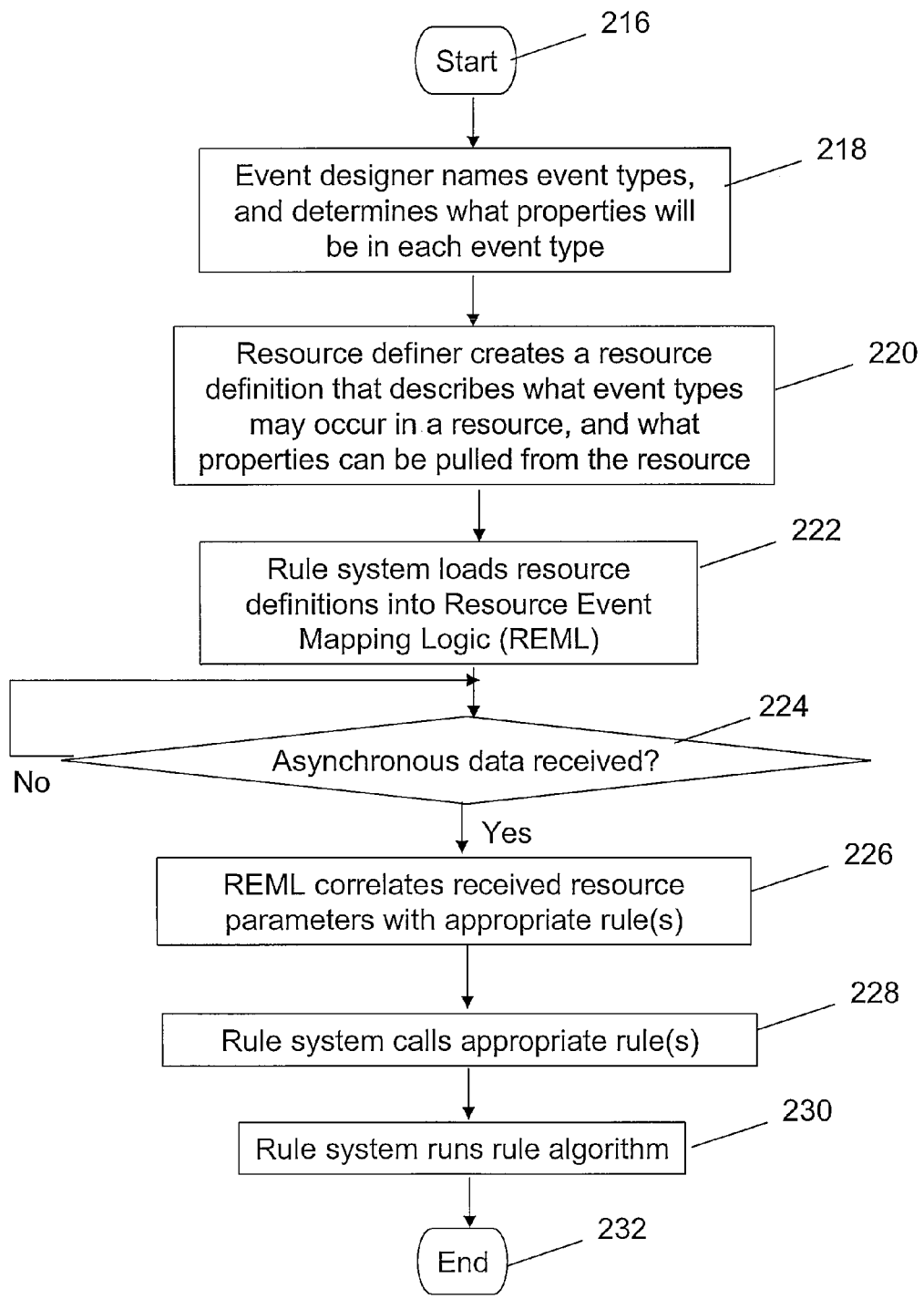

With reference now to FIG. 2b, additional detail of how the REML 212 is created and utilized is presented. After initiator block 216, an event designer names event types, and determines what properties will be in each event type (block 218). For example, consider an event such as "outputting data that describes a server state." The event designer may give this event the name "server state," and then define data that is associated with "server state." Such data may include CPU utilization, page swap rate, processor temperature, number of logged-on users, etc. for that server resource 202.

As shown in block 220, a resource definer creates a resource definition that describes what event types may occur in a resource, and what properties may be pulled (e.g., using WSDL, or an extension thereof) from that resource 202 by a rule system 204. These event types may evoke data, from resource 202, that can be classified as pulls, synchronous pushes, or asynchronous pushes (as defined above). Continue to assume, for exemplary purposes, that the resource 202 is a server. The resource definition includes what events may occur in a resource 202, including the example "server state" described above. That is, the resource 202 may be capable of experiencing one or more events, including the event of "outputting data that describes a server state." This capability is thus described in the resource definition. The resource definition also describes what properties may be pulled from that resource 202. These properties may or may not include all of the properties that are associated with a particular event type. That is, although the resource definition says that the server resource 202 may experience the event of "outputting data that describes a server state," only some of the data described in "server state" (described above with reference to block 218) may be available from the server resource 202. Nonetheless, only a portion of the data described in "server state" may be enough to invoke a call and execution of a rule, for the data-sending resource 202, by REML 212.

As described in block 222, once the resource definition has been created by the resource definer (which, like the event designer, may be a person or an intelligent piece of hardware/software logic), the resource definition is loaded into the REML 212 by the rule system 204, which then waits for asynchronous data to be received (query block 224). Once this data is received from a resource 202, then the REML 212 correlates the received data (resource parameters) with one or more appropriate rules (block 226). For example, if the REML 212 determines that the data received describes CPU utilization in a particular server, then the REML 212 "knows" that a particular rule from rules database 208 should be used to evaluate this CPU utilization. Note that REML 212 may also know which rules are for synchronous events and which are for asynchronous events. In one embodiment, REML 212 "knows" which rules are for synchronous/asynchronous events by a parameter found in the definition of the event type. Thus, if an asynchronous data is received (as described above), then only asynchronous event rules are evaluated for application, thus allowing optimized rule processing.

Thereafter, the appropriate rule is called by REML 212 for use by rules logic 206 (block 228). The appropriate rule is applied to the received data, and the resulting output data (if any, depending on whether an "if" condition has been satisfied, by the received data, in the called rule) is sent to the resource (block 230). The process ends at terminator block 232.

Figure 3:
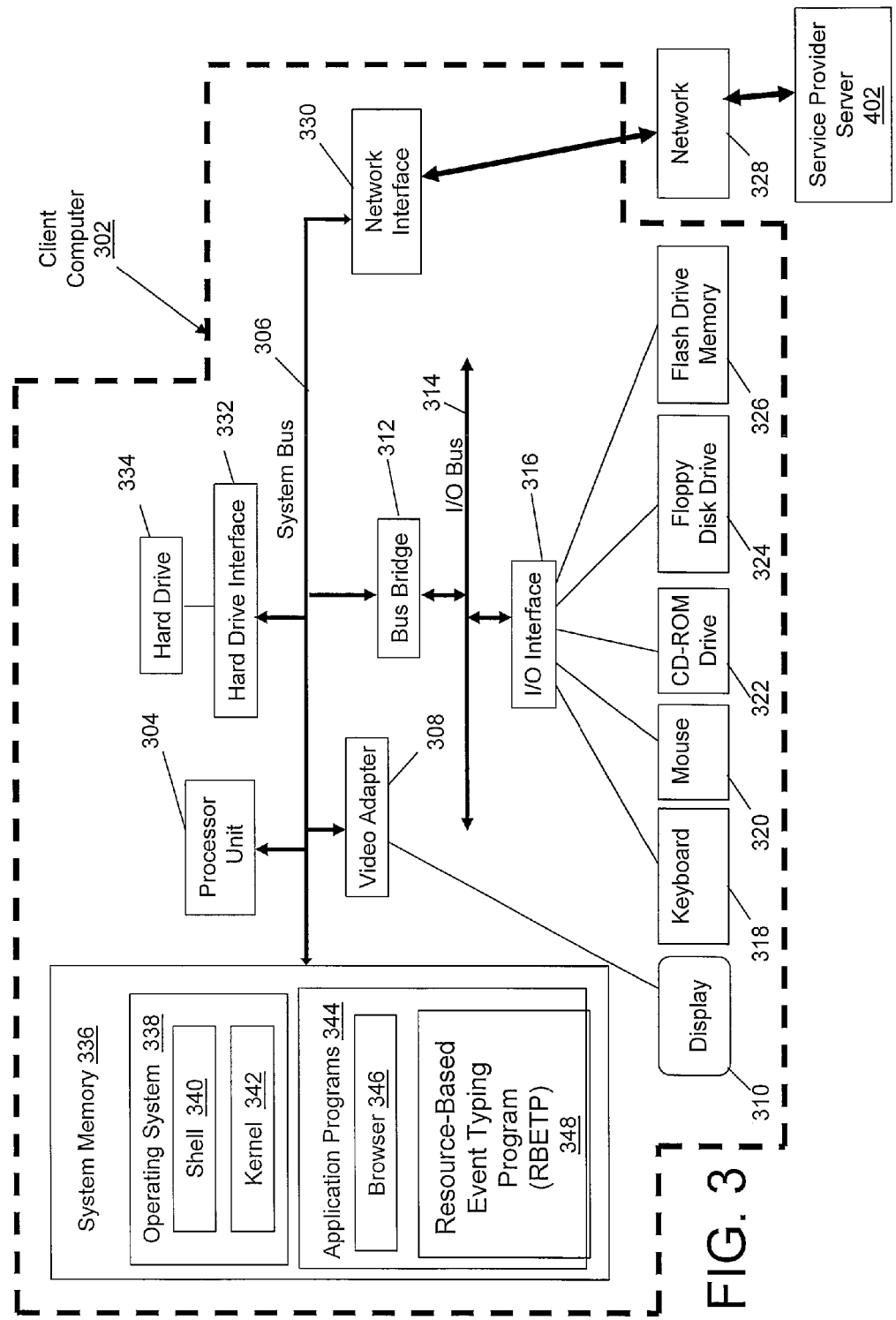
FIG. 3 depicts an exemplary client computer in which the present invention may implemented.

With reference now to FIG. 3, there is depicted a block diagram of an exemplary client computer 302, in which the present invention may be utilized. Client computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Client computer 302 is able to communicate with a service provider server 402 via a network 328 using a network interface 330, which is coupled to system bus 306. Network 328 may be an external network such as the Internet, or an internal network such as an Ethernet or a Virtual Private Network (VPN). Using network 328, client computer 302 is able to use the present invention to access service provider server 402.

A hard drive interface 332 is also coupled to system bus 306. Hard drive interface 332 interfaces with a hard drive 334. In a preferred embodiment, hard drive 334 populates a system memory 336, which is also coupled to system bus 306. System memory is defined as a lowest level of volatile memory in client computer 302. This volatile memory may include additional higher levels of volatile memory (not shown), including but not limited to cache memory, registers, and buffers. Data that populates system memory 336 includes client computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., client computer 302) to send and receive network messages to the Internet using HyperText Transfer Protocol (HTTP) messaging, thus enabling communication with service provider server 402.

Application programs 344 in client computer 302's system memory also include a Resource-Based Event Typing Program (RBETP) 348, which includes code for implementing the processes described in FIGS. 2*a-b*. In one embodiment, client computer 302 is able to download RBETP 348 from service provider server 402.

The hardware elements depicted in client computer 302 are not intended to be exhaustive, but rather are representative to highlight essential components required by the present invention. For instance, client computer 302 may include alternate memory storage devices such as magnetic cassettes, Digital Versatile Disks (DVDs), Bernoulli cartridges, and the like. These and other variations are intended to be within the spirit and scope of the present invention.

Figure 4:
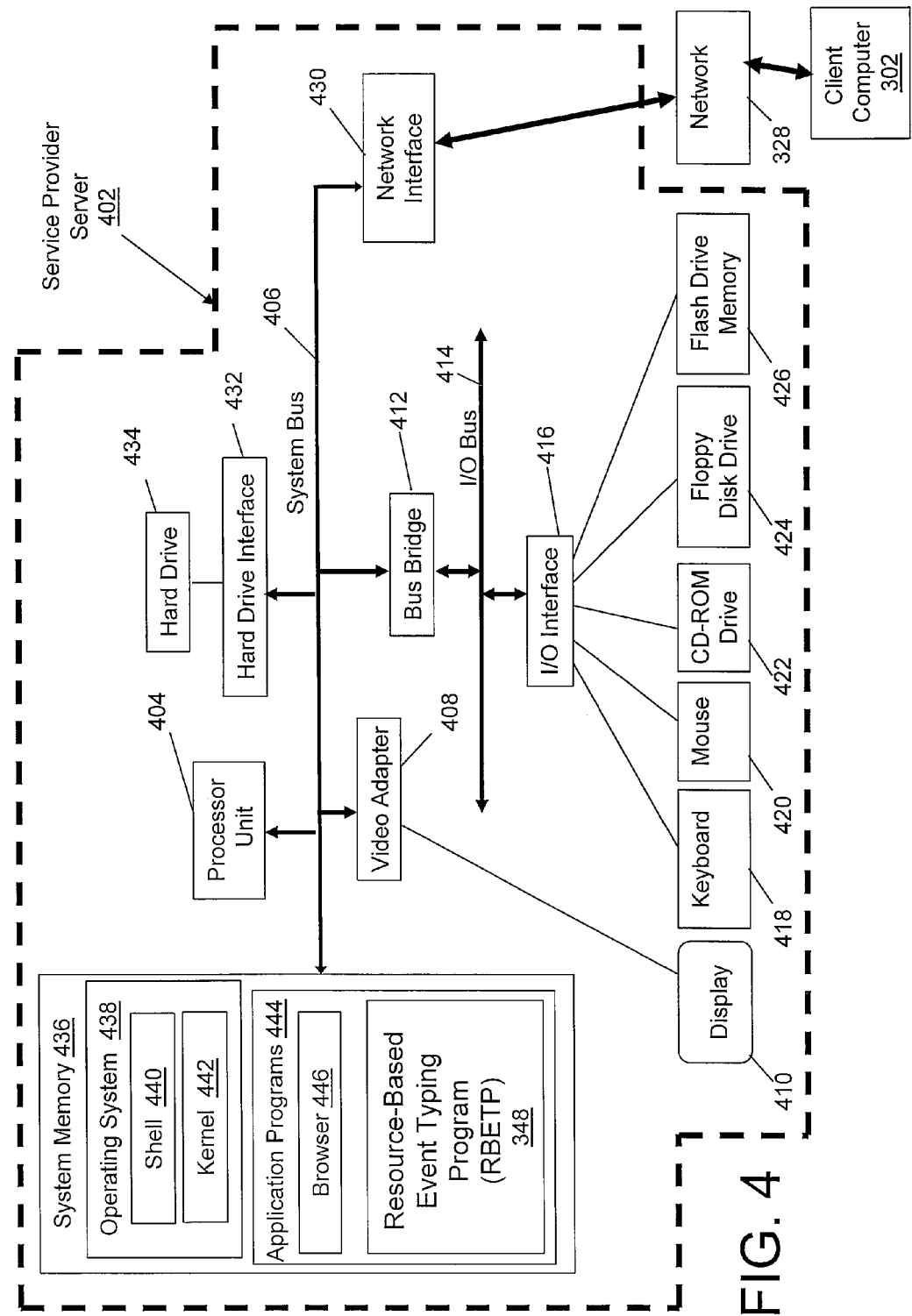
FIG. 4 illustrates an exemplary server from which software for executing the present invention may be deployed and/or implemented for the benefit of a user of the client computer shown in FIG. 3.

As noted above, RBETP 348 can be downloaded to client computer 302 from service provider server 402, shown in exemplary form in FIG. 4. Service provider server 402 includes a processor unit 404 that is coupled to a system bus 406. A video adapter 408 is also coupled to system bus 406. Video adapter 408 drives/supports a display 410. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Service provider server 402 is able to communicate with client computer 302 via network 328 using a network interface 430, which is coupled to system bus 406. Access to network 328 allows service provider server 402 to execute and/or download RBETP 348 to client computer 302.

System bus 406 is also coupled to a hard drive interface 432, which interfaces with a hard drive 434. In a preferred embodiment, hard drive 434 populates a system memory 436, which is also coupled to system bus 406. Data that populates system memory 436 includes service provider server 402's operating system 438, which includes a shell 440 and a kernel 442. Shell 440 is incorporated in a higher level operating system layer and utilized for providing transparent user access to resources such as application programs 444, which include a browser 446, and a copy of RBETP 348 described above, which can be deployed to client computer 302.

The hardware elements depicted in service provider server 402 are not intended to be exhaustive, but rather are representative to highlight essential components required by the present invention. For instance, service provider server 402 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 402 performs all of the functions associated with the present invention (including execution of RBETP 348), thus freeing client computer 302 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of RBETP 348, are performed by service provider server 402. Alternatively, RBETP 348 and the method described herein, and in particular as shown and described in FIGS. 2a-b, can be deployed as a process software from service provider server 402 to client computer 302. Still more particularly, process software for the method so described may be deployed to service provider server 402 by another service provider server (not shown).

Figure 5A:
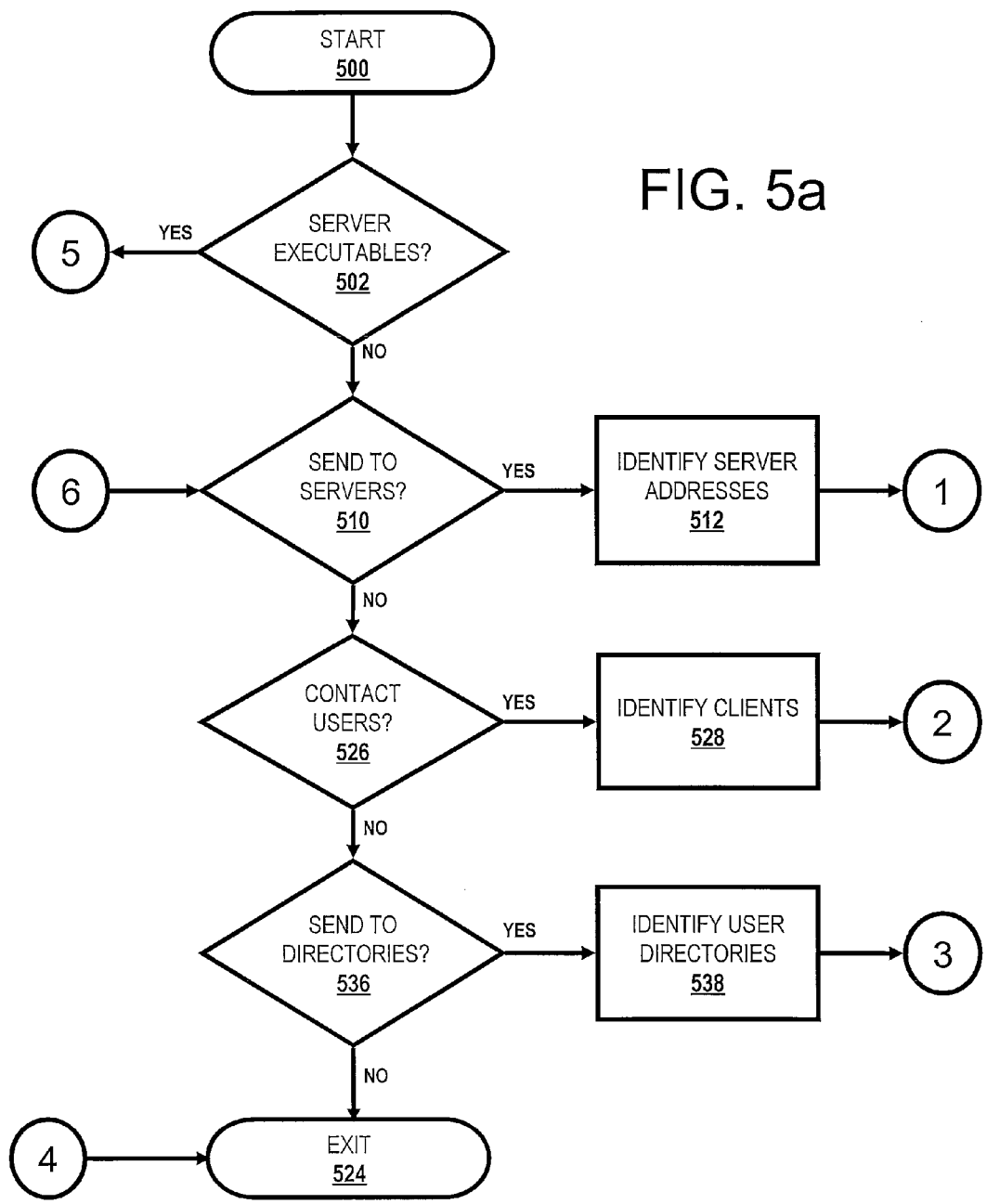

Referring then to FIGS. 5a-b, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 520). Another embodiment is to have the servers automatically copy the process software to each client and then run the installation program for the process software at each client computer. The user executes the program that installs the process software on his client computer (block 522) then exits the process (terminator block 524).

In query step 526, a determination is made whether the process software is to be deployed by sending the process software to users via e-mail. The set of users where the process software will be deployed are identified together with the addresses of the user client computers (block 528). The process software is sent via e-mail to each of the users' client computers (block 530). The users then receive the e-mail (block 532) and then detach the process software from the e-mail to a directory on their client computers (block 534). The user executes the program that installs the process software on his client computer (block 522) then exits the process (terminator block 524).

Lastly a determination is made as to whether the process software will be sent directly to user directories on their client computers (query block 536). If so, the user directories are identified (block 538). The process software is transferred directly to the user's client computer directory (block 540). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his client computer (block 522) and then exits the process (terminator block 524).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6A:
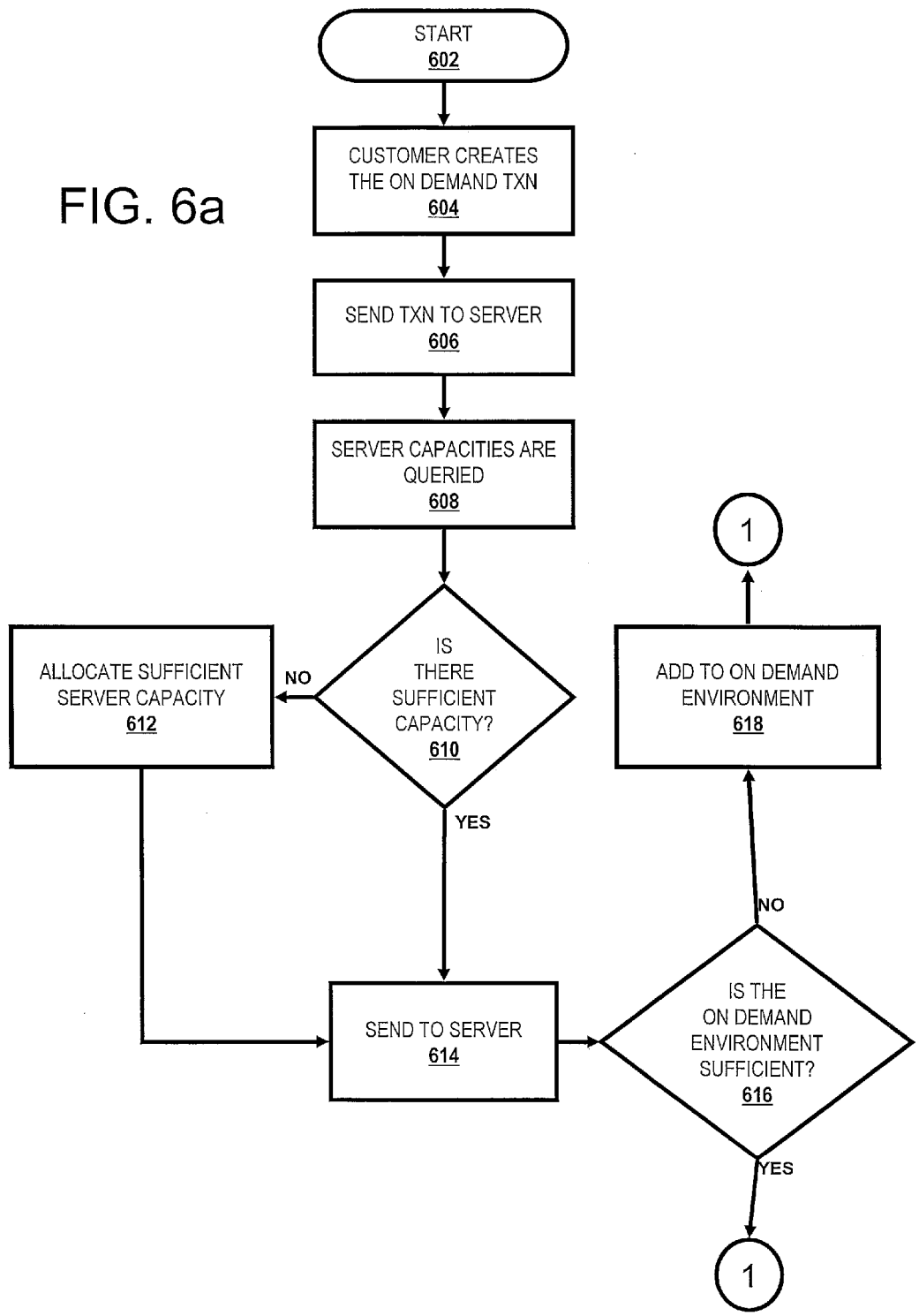
FIGS. 6a-b show a flow-chart showing steps taken to execute the steps shown and described in FIGS. 2a-b using an on-demand service provider.
Figure 6B:
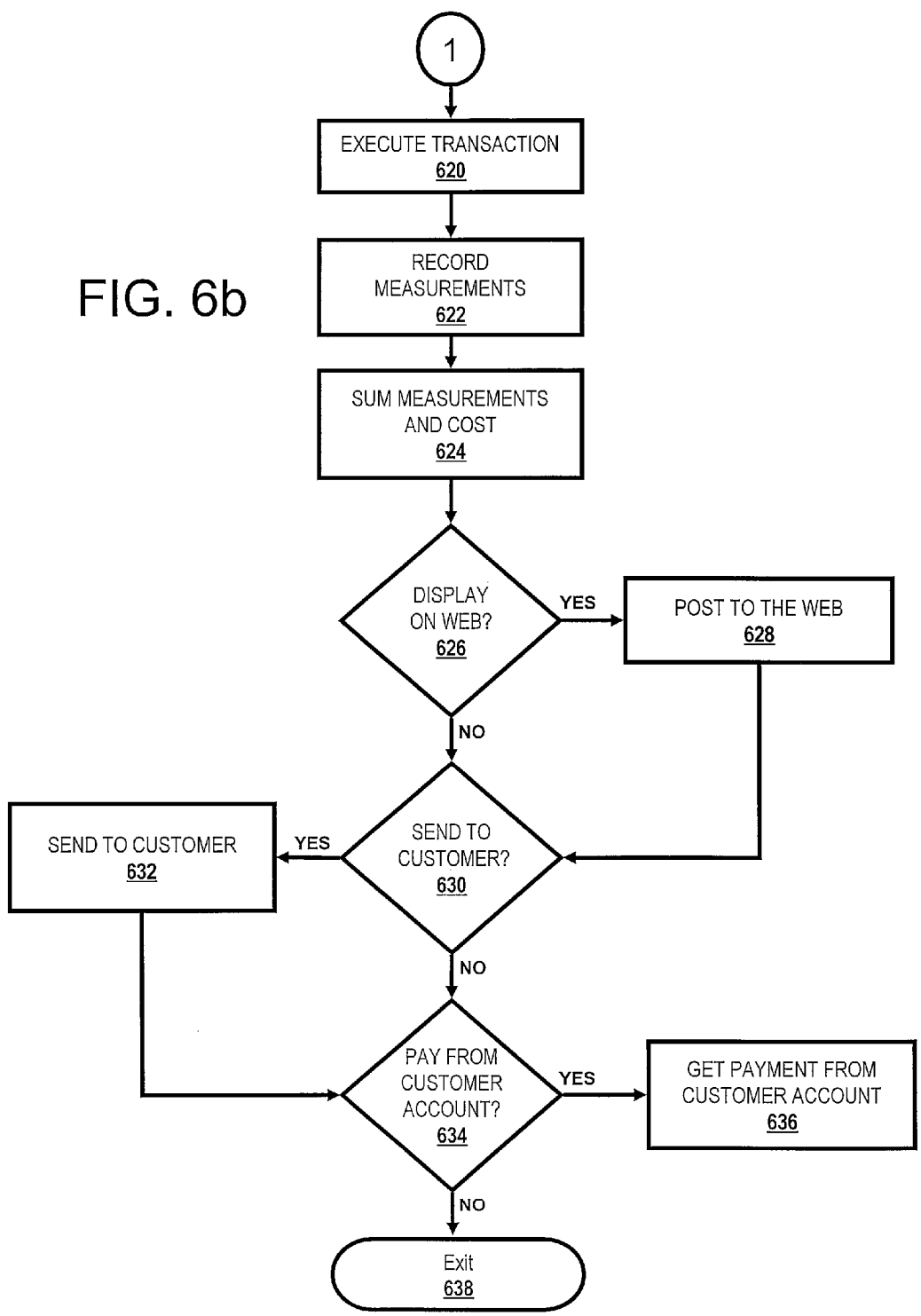

With reference now to FIGS. 6a-b, initiator block 602 begins the On Demand process. A transaction is created than contains the unique customer identification, the requested service type and any service parameters that further, specify the type of service (block 604). The transaction is then sent to the main server (block 606). In an On Demand environment the main server can initially be the only server, then as capacity is consumed other servers are added to the On Demand environment.

The server central processing unit (CPU) capacities in the On Demand environment are queried (block 608). The CPU requirement of the transaction is estimated, then the servers available CPU capacity in the On Demand environment are compared to the transaction CPU requirement to see if there is sufficient CPU available capacity in any server to process the transaction (query block 610). If there is not sufficient server CPU available capacity, then additional server CPU capacity is allocated to process the transaction (block 612). If there was already sufficient Available CPU capacity then the transaction is sent to a selected server (block 614).

Before executing the transaction, a check is made of the remaining On Demand environment to determine if the environment has sufficient available capacity for processing the transaction. This environment capacity consists of such things as but not limited to network bandwidth, processor memory, storage etc. (block 616). If there is not sufficient available capacity, then capacity will be added to the On Demand environment (block 618). Next the required software to process the transaction is accessed, loaded into memory, then the transaction is executed (block 620).

The usage measurements are recorded (block 622). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 624).

If the customer has requested that the On Demand costs be posted to a web site (query block 626), then they are posted (block 628). If the customer has requested that the On Demand costs be sent via e-mail to a customer address (query block 630), then these costs are sent to the customer (block 632). If the customer has requested that the On Demand costs be paid directly from a customer account (query block 634), then payment is received directly from the customer account (block 636). The On Demand process is then exited at terminator block 638.

The present invention thus presents a computer-implementable method, system and computer media for typing a resource-based event in a rule system. In one embodiment, the computer-implementable method includes the steps of: defining an event type according to a resource property that is associated with the event type; creating a resource definition that describes which one or more event type can occur in a resource; storing the resource definition in a Resource:Event Mapping Logic (REML) in the rule system; receiving asynchronous data from a particular resource in the data processing system; utilizing the REML to correlate the asynchronous data with a particular rule that is associated with a resource definition for the particular resource; and applying the particular rule to the asynchronous data. The resource definition may describe what property data can be pulled from the resource by the rule system. In one embodiment, in which a rules logic in the rule system manipulates the asynchronous data, in accordance with the particular rule, to produce an output, the computer-implementable method further comprises transmitting the output of the particular rule to the particular resource. The computer-implementable method may also include the steps of selecting the particular rule from multiple rules that are authorized to be used by the particular resource; defining each of the multiple rules as being applicable for use on either a synchronous data or an asynchronous data, wherein the synchronous data includes a request for a particular rule, and wherein the asynchronous data does not specify a particular rule to which received data is applied; determining if data received by the rule system is synchronous or asynchronous; and in response to determining that the data received by the rule system is asynchronous, searching the rule system only for rules that use asynchronous data as an input. The rule system may also be part of a resource manager that manages at least one resource in the data processing system.

Note further that, as described above, instructions used in each embodiment of a computer-usable medium may be deployed from a service provider to a user. This deployment may be made in an "on-demand" basis as described herein.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method of typing a resource-based event in a rule system, the computer-implementable method comprising:
   defining an event type according to a resource property that is associated with the event type;
   creating a resource definition that describes which one or more event type can occur in a resource;
   storing the resource definition in the rule system;
   defining each of multiple rules in the rule system as being applicable for use on either a synchronous data or an asynchronous data, wherein the synchronous data includes a request for a particular rule, and wherein the asynchronous data does not specify a particular rule to which received data is applied;
   receiving data from a particular resource in the data processing system;
   determining if said data received is synchronous data or asynchronous data; and
   in response to determining that the data received is asynchronous data, searching the rule system only for rules that use asynchronous data as an input;
   correlating the asynchronous data with a particular rule that is associated with a resource definition for the particular resource; and
   applying the particular rule to the asynchronous data.

2. The computer-implementable method of claim 1, wherein the resource definition further describes what property data can be pulled from the resource by the rule system.

3. The computer-implementable method of claim 1, wherein a rules logic in the rule system manipulates the asynchronous data, in accordance with the particular rule, to produce an output, and wherein the computer-implementable method further comprises:
   transmitting the output of the particular rule to the particular resource.

4. The computer-implementable method of claim 1, wherein the particular resource is a server, the computer-implementable method further comprising:
   receiving a server state from the server as the asynchronous data, wherein the server state describes a processor utilization level of the server, a page swap rate of the server, a processor temperature in the server, and a number of logged-on users to the server; and
   utilizing the server state that is received from the server to retrieve the particular rule.

5. The computer-implementable method of claim 1, further comprising:
   retrieving the particular rule based on the data received from the particular resource; and
   pulling additional data from the particular resource, wherein the additional data is data that is not found in the asynchronous data received from the particular resource, and wherein the additional data is required to execute the particular rule.

6. The computer-implementable method of claim 1, wherein the rule system is part of a resource manager that manages at least one resource in the data processing system.

7. A system comprising:
   a processor;
   a data bus coupled to the processor;
   a memory coupled to the data bus; and
   a computer-usable medium embodying computer program code, the computer program code comprising instructions executable by the processor and configured for:
   defining an event type according to a resource property that is associated with the event type;
   creating a resource definition that describes which one or more event type can occur in a resource;
   storing the resource definition in the rule system;
   defining each of multiple rules in the rule system as being applicable for use on either a synchronous data or an asynchronous data received from the resource, wherein the synchronous data includes a request for a particular rule from the rule system, and wherein the asynchronous data does not specify a particular rule to which received data is applied;
   receiving data from a particular resource in the data processing system;
   determining if said data received is synchronous data or asynchronous data; and
   in response to determining that the data received is asynchronous data, searching the rule system only for rules that use asynchronous data as an input;

correlating the asynchronous data with a particular rule that is associated with a resource definition for the particular resource; and applying the particular rule to the asynchronous data.

8. The system of claim 7, wherein the resource definition further describes what property data can be pulled from the resource by the rule system.

9. The system of claim 7, wherein a rules logic in the rule system manipulates the asynchronous data, in accordance with the particular rule, to produce an output, and wherein the instructions are further configured for:

transmitting the output of the particular rule to the particular resource.

10. The system of claim 7, wherein the particular resource is a server, and wherein the instructions are further configured for:

receiving a server state from the server as the asynchronous data, wherein the server state describes a processor utilization level of the server, a page swap rate of the server, a processor temperature in the server, and a number of logged-on users to the server; and utilizing the server state that is received from the server to retrieve the particular rule.

11. The system of claim 10, wherein the instructions are further configured for:

retrieving the particular rule based on the data received from the particular resource; and pulling additional data from the particular resource, wherein the additional data is data that is not found in the asynchronous data received from the particular resource, and wherein the additional data is required to execute the particular rule.

12. The system of claim 7, wherein the rule system is part of a resource manager that manages at least one resource in the data processing system.

13. A non-transitory computer-usable storage medium embodying computer program code, the computer program code comprising computer executable instructions configured for:

defining an event type according to a resource property that is associated with the event type;

creating a resource definition that describes which one or more event type can occur in a resource;

storing the resource definition in the rule system;

defining each of multiple rules in the rule system as being applicable for use on either a synchronous data or an asynchronous data received from the resource, wherein the synchronous data includes a request for a particular rule from the rule system, and wherein the asynchronous data does not specify a particular rule to which received data is applied;

receiving data from a particular resource in the data processing system;

determining if said data received is synchronous data or asynchronous data; and in response to determining that the data received is asynchronous data, searching the rule system only for rules that use asynchronous data as an input;

correlating the asynchronous data with a particular rule that is associated with a resource definition for the particular resource; and applying the particular rule to the asynchronous data.

14. The non-transitory computer-usable storage medium of claim 13, wherein the resource definition further describes what property data can be pulled from the resource by the rule system.

15. The non-transitory computer-usable storage medium of claim 13, wherein a rules logic in the rule system manipulates the asynchronous data, in accordance with the particular rule, to produce an output, and wherein the computer executable instructions are further configured for:

transmitting the output of the particular rule to the particular resource.

16. The non-transitory computer-usable storage medium of claim 13, wherein the particular resource is a server, and wherein the computer executable instructions are further configured for:

receiving a server state from the server as the asynchronous data, wherein the server state describes a processor utilization level of the server, a page swap rate of the server, a processor temperature in the server, and a number of logged-on users to the server; and utilizing the server state that is received from the server to retrieve the particular rule.

17. The non-transitory computer-usable storage medium of claim 16, wherein the computer executable instructions are further configured for:

retrieving the particular rule based on the data received from the particular resource; and pulling additional data from the particular resource, wherein the additional data is data that is not found in the asynchronous data received from the particular resource, and wherein the additional data is required to execute the particular rule.

18. The non-transitory computer-usable storage medium of claim 13, wherein the rule system is part of a resource manager that manages at least one resource in the data processing system.

19. The non-transitory computer-usable storage medium of claim 13, wherein the computer-usable medium is a component of a remote server, and wherein the computer executable instructions are deployable to a client computer from the remote server.

20. The non-transitory computer-usable storage medium of claim 13, wherein the computer executable instructions are capable of being provided by a service provider to a customer on an on-demand basis.

* * * * *